US008092042B2

(12) United States Patent
Wilcox (10) Patent No.: US 8,092,042 B2
(45) Date of Patent: Jan. 10, 2012

(54) SHIELD MEMBER IN LED APPARATUS (75) Inventor: Kurt S. Wilcox, Libertyville, IL (US)

(73) Assignee: Ruud Lighting, Inc., Racine, WI (US)

( * ) Notice: Subject to any disclaimer, the term of this patent is extended or adjusted under 35 U.S.C. 154(b) by 1272 days.

(21) Appl. No.: 11/743,961

(22) Filed: May 3, 2007

(65) Prior Publication Data
US 2008/0272380 A1 Nov. 6, 2008

(51) Int. Cl.
*F21V 21/00* (2006.01)
(52) U.S. Cl. .................. 362/249.02; 362/236; 362/613; 362/182; 362/227; 362/249.1
(58) Field of Classification Search .................. 362/227, 362/267, 613, 612, 800, 158, 812, 236, 238, 362/249.02, 249.1, 249.11
See application file for complete search history.

(56) References Cited

U.S. PATENT DOCUMENTS

| | | | |
|---|---|---|---|
| 4,254,453 A | 3/1981 | Mouyard et al. | |
| 5,274,250 A | 12/1993 | Miyake et al. | |
| 5,617,131 A | 4/1997 | Murano et al. | |
| 5,711,890 A | 1/1998 | Hawkins et al. | |
| 5,796,154 A | 8/1998 | Sano et al. | |
| 5,984,494 A | 11/1999 | Chapman et al. | |
| 6,325,524 B1 | 12/2001 | Weber et al. | |
| 6,414,343 B1 | 7/2002 | Kondo et al. | |
| 6,502,956 B1 | 1/2003 | Wu | |
| 6,630,736 B1 | 10/2003 | Ignaut | |
| 6,635,911 B2 | 10/2003 | Maruyama | |
| 6,635,941 B2 | 10/2003 | Suda | |
| 6,730,940 B1 | 5/2004 | Steranka et al. | |
| 6,837,605 B2 | 1/2005 | Reill | |
| 6,876,008 B2 | 4/2005 | Bhat et al. | |
| 6,893,941 B2 | 5/2005 | Suda | |
| 6,969,946 B2 | 11/2005 | Steranka et al. | |
| 6,972,439 B1 | 12/2005 | Kim et al. | |
| 7,009,213 B2 | 3/2006 | Camras et al. | |
| 7,019,334 B2 | 3/2006 | Yatsuda et al. | |
| 7,078,258 B2 | 7/2006 | Sakoh et al. | |

(Continued)

FOREIGN PATENT DOCUMENTS
DE    94 17 326 U1    2/1995
(Continued)

OTHER PUBLICATIONS

International Search Report for co-pending PCT patent application serial No. PCT/US08/05854, dated Aug. 18, 2008 (1 page).

*Primary Examiner* — Anabel Ton
(74) *Attorney, Agent, or Firm* — Jansson Shupe & Munger Ltd.

(57) ABSTRACT

An LED apparatus for illumination toward a preferential side in a downward and outward direction including a shield member in the form of a layer positioned over LED packages and secondary lens members. The shield member has a shield portion and a substantially planar non-shield portion thereabout. In preferred embodiments, the shield portion extends over a part of the lens portion of the secondary lens member. A cover preferably secures the shield member with respect to the secondary lens member, the primary lens and the LED package, the shield member preferably being sandwiched between the cover and the flange of the secondary lens member.

24 Claims, 8 Drawing Sheets

U.S. PATENT DOCUMENTS

| | | | |
|---|---|---|---|
| 7,080,932 B2 | 7/2006 | Keuper | |
| 7,102,185 B2 | 9/2006 | Nichols et al. | |
| 7,141,825 B2 | 11/2006 | Horio et al. | |
| 7,176,070 B2 | 2/2007 | Lee et al. | |
| 7,182,480 B2 | 2/2007 | Kan | |
| 7,281,818 B2 | 10/2007 | You et al. | |
| 7,530,711 B2 * | 5/2009 | Bang | 362/241 |
| 7,543,953 B2 * | 6/2009 | Chapman | 362/205 |
| 7,566,147 B2 * | 7/2009 | Wilcox et al. | 362/249.02 |
| 7,637,624 B2 * | 12/2009 | Chin | 362/92 |
| 7,637,630 B2 * | 12/2009 | Wilcox et al. | 362/267 |
| 7,654,691 B2 * | 2/2010 | Liu et al. | 362/249.02 |
| 7,938,558 B2 * | 5/2011 | Wilcox et al. | 362/236 |
| 2004/0156209 A1 | 8/2004 | Ishida | |
| 2004/0251469 A1 | 12/2004 | Yatsuda et al. | |
| 2006/0158080 A1 | 7/2006 | Nakano et al. | |
| 2006/0169878 A1 | 8/2006 | Kasano et al. | |
| 2006/0175626 A1 | 8/2006 | Wall, Jr. | |
| 2006/0176686 A1 | 8/2006 | McVicker | |
| 2006/0187671 A1 | 8/2006 | Coushaine et al. | |
| 2007/0070625 A1 | 3/2007 | Bang | |
| 2007/0097684 A1 | 5/2007 | Obara et al. | |

FOREIGN PATENT DOCUMENTS

| | | | |
|---|---|---|---|
| JP | 10 268800 A | 3/1997 | |

* cited by examiner

SHIELD MEMBER IN LED APPARATUS

FIELD OF THE INVENTION

The invention relates generally to the field of lighting systems and, more particularly, to apparatus for utilizing LED (light-emitting diode) sources for illuminating areas with a predefined pattern of light intensity toward a preferential side.

BACKGROUND OF THE INVENTION

There is a continuing need for lighting apparatus which is low-cost and energy efficient. LEDs provide light sources which are energy efficient, and advances in LED technology are providing even greater such efficiencies over time. One advantage of using LEDs as light sources is simply that the smaller size of such sources translate into lower material usage within fixtures containing such sources, thus yielding the attendant cost-efficiency.

Preferred performance requirements for lighting systems for various uses involve freedom of "light spillage" into areas not intended to be lit. For example, it is preferred that roadway and parking lot lighting systems have excellent light distribution over areas which are to be lighted, but neighboring regions are as free of light as possible. More specifically, there is a need to be able to direct light in a downward and preferential lateral direction while avoiding so-called trespass lighting on neighboring property, while providing lighting to the roadways or parking lots. Satisfying such concerns can be difficult when LEDs are used as light sources, particularly given the fact that in such cases many LEDs are used in individual fixtures.

Various LED lighting fixtures with light shielding have been developed. Examples of such prior art fixtures are those disclosed in the following United States patents: U.S. Pat. No. 7,019,334 (Yatsuda, et al), U.S. Pat. No. 6,972,439 (Kim et al,) and Patent Publication Nos: US 2006/0175626 (Wall Jr.) and US 2006/0158080 (Nakano et al,).

LED fixtures in the prior art having shields have certain shortcomings and disadvantages to which this invention is addressed. In particular, there is a need for an improved LED light fixture with directional shield that facilitates accurate manufacture while having an improved effectiveness in light distribution, including avoidance of light distribution to a non-preferential side. It would be desirable that an LED light fixture with directional shielding which is cost-effective in manufacture be able to provide a high level of output for lighting large areas in a preferential direction while minimizing light in a non-preferential direction.

OBJECTS OF THE INVENTION

It is an object of this invention, to provide LED lighting apparatus with directional shielding which overcomes certain problems and shortcoming of the prior art including those referred to above.

Another object of this invention is to provide LED lighting apparatus with directional shielding which by its nature facilitates accurate manufacture, including of multi-LED fixtures.

Another object of this invention is to provide LED lighting apparatus with directional shielding having the above advantages and with improved effectiveness in light distribution, including avoidance of light distribution to a non-preferential side.

Another object of this invention is to provide LED lighting apparatus with directional shielding which is particularly adaptable for LED fixtures providing a high level of light output for lighting of large areas such as roadways and parking lots.

Yet another object of this invention is to provide an LED lighting apparatus with directional shielding having the above advantages which directs light using a shield in the above fashion in a cost-effective manner.

These and other objects of the invention will be apparent from the following descriptions and the drawings.

SUMMARY OF THE INVENTION

This invention is an LED apparatus for improved illumination toward a preferential side in a downward and outward direction. The apparatus is the type including a mounting board, and LED package thereon with a primary lens having a central axis and a secondary lens member over the primary lens which establishes a light path therebetween the improved apparatus of this invention includes a shield member in the form of a layer which is positioned over the mounting board, LED package and secondary lens member, the shield member having a shield portion and a substantially planar non-shield portion thereabout.

In certain preferred embodiments the shield member has a shield member aperture aligned with the light path and the shield portion borders the shield-member aperture. It is most preferred that the secondary lens member includes a lens portion and a flange thereabout; and the shield portion extends over a part of the lens portion of the secondary lens member. Highly desirable is where the shield member has a shield-member aperture aligned with the light path and the shield portion borders the shield-member aperture.

Preferably the secondary lens member is asymmetrical and has an illumination pattern with a preferential side and a non-preferential side. The shield portion is positioned to intercept light on the non-preferential side. Preferred embodiments include a cover which secures the shield member with respect to the secondary lens member, the primary lens and the LED package. The cover has an opening aligned with the light path.

Preferred embodiments have the shield member sandwiched between the cover and the flange of the secondary lens member. Preferably the flange of the secondary lens member is against the mounting board. The sandwiching is of the non-shield portion of the shield member and of the flange of the secondary lens member when the cover is secured in place.

In certain embodiments, a resilient gasket is disposed between the shield member and the secondary lens. It is most preferred that the shield portion has a reflective surface facing the secondary lens.

In highly preferred embodiments, the LED packages, secondary lens member and shield portion are a plurality of LED packages, secondary lens members and shield portions. Preferably the LED packages are spaced from one another on the mounting board. It is highly preferred that each secondary lens member is positioned over the primary lens of a corresponding LED package, each primary-lens/secondary-lens-member pair establishes a light path and has a central axis. Also preferred is where there is a plurality of shield portions of the shield member. Each shield portion is positioned partially over each primary-lens/secondary-lens-member pair thereby to intercept a portion of the light emitted from the corresponding LED package.

The LED apparatus for illumination toward a preferential side in a downward and outward direction, in some embodiments, may include a mounting board and an LED package thereon with a primary lens which has a central axis. The improvement comprises a shield member in the form of a layer positioned over the mounting board and an LED package. The shield member has a shield portion and a substantially planar non-shield portion thereabout.

The term "downward" is used herein for convenience in describing the invention and aspects thereof, but does not in any way mandate usage of the apparatus in any orientation. In other words, "downward" is not limited by the direction of gravity. Thus, it a light fixture incorporating the inventive light-directing LED apparatus disclosed herein is oriented upward rather than downward, or in some laterally-oriented direction, the term "downward" subsumes such meanings. The term "downward" has been used since one important application for the inventive apparatus is the lighting of ground surfaces from vertical light poles. Note that the figures primarily show such "downward" direction as generally upward since visualization of the compound outer lens surface of the secondary lens in perspective is best viewed for clarity in such orientation.

The term "LED package" as used herein means an assembly including a base, at least one LED (sometimes referred to as "die") on the base, and a primary lens over the die. One or more, typically several, LED packages are arranged on a mounting board in forming that is referred to as an "LED module." One or more LED modules are used as the light source for various innovative lighting fixtures.

The inventive apparatus will most typically be used in applications when a multiplicity of such devices are arranged on what is referred to as an LED module, one or more of which are used within a lighting fixture to achieve desired illumination. Roadway and parking lot lighting are such applications, although there are a great many other applications for such devices.

BRIEF DESCRIPTION OF THE DRAWINGS

The drawings illustrate a preferred embodiment including the above-noted characteristics and features of the invention. The invention will be readily understood from the descriptions and drawings. In the drawings.

DETAILED DESCRIPTION OF PREFERRED EMBODIMENTS

Figure 1:
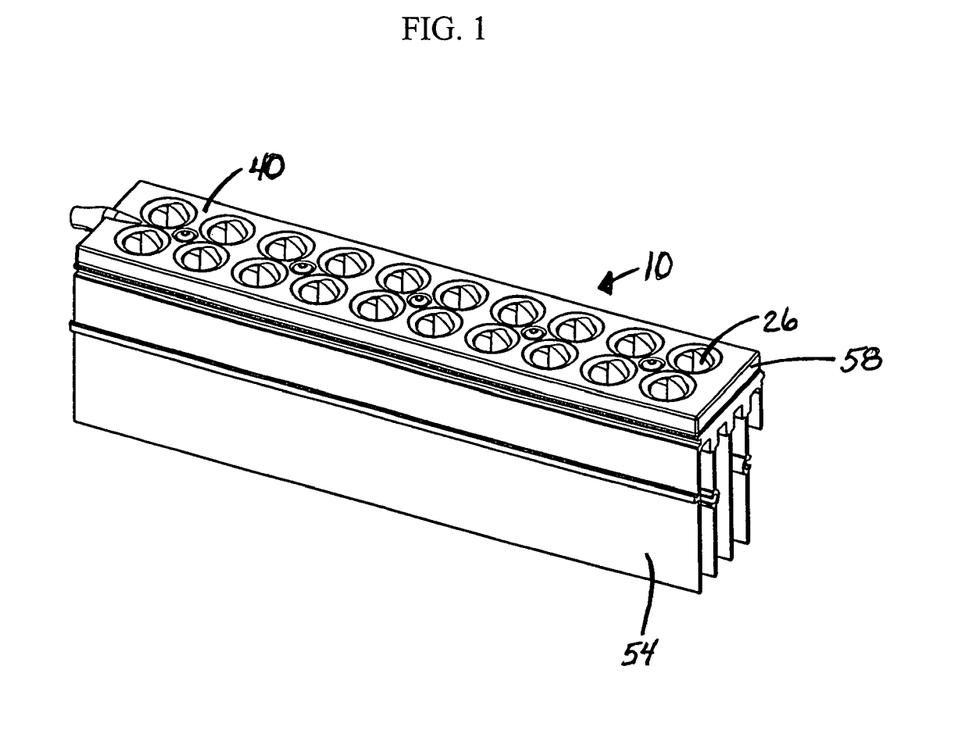
FIG. 1 is a perspective view of a LED lighting apparatus in accordance with this invention, the LED lighting apparatus being a portion of a lighting fixture.
Figure 2:
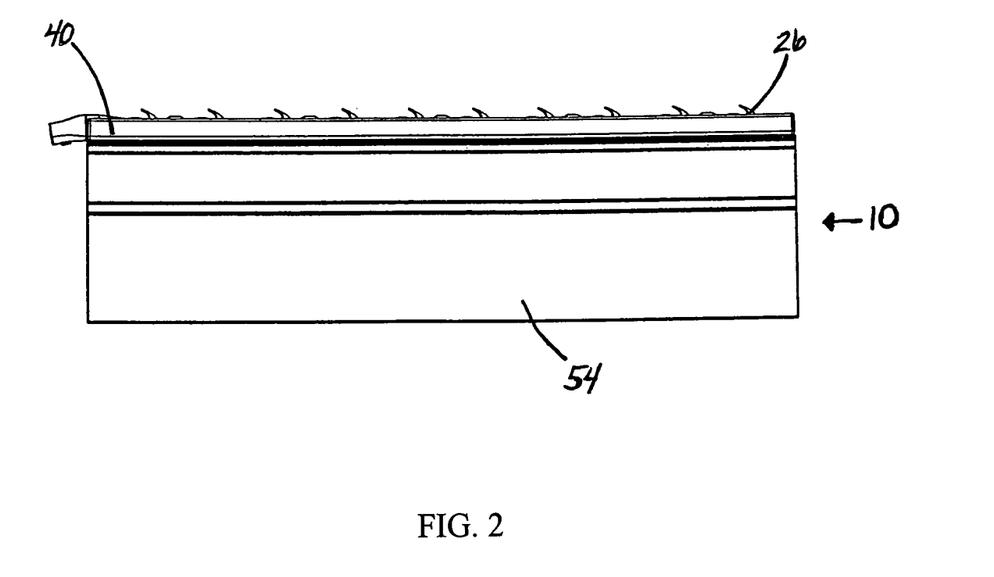
FIG. 2 is a front elevation of the apparatus of FIG. 1.

FIGS. 1-4 and 9 illustrate an LED apparatus 10 for illumination toward a preferential side 36 in a downward direction 48 and outward direction 49. LED apparatus 10 includes a mounting board 12, LED package 14 thereon with primary lens 16 having central axis 18, and secondary lens member 20 over primary lens 16 and establishing light path 22 therebetween. The mounting board 12 is connected to a heat sink 54 as shown in FIGS. 1 and 2. One or more, typically several, LED packages 14 are arranged on a mounting board 12 to form what is referred to as an LED module 58. One or more LED modules 58 are used as the light source for various innovative lighting fixtures.

Figure 3:
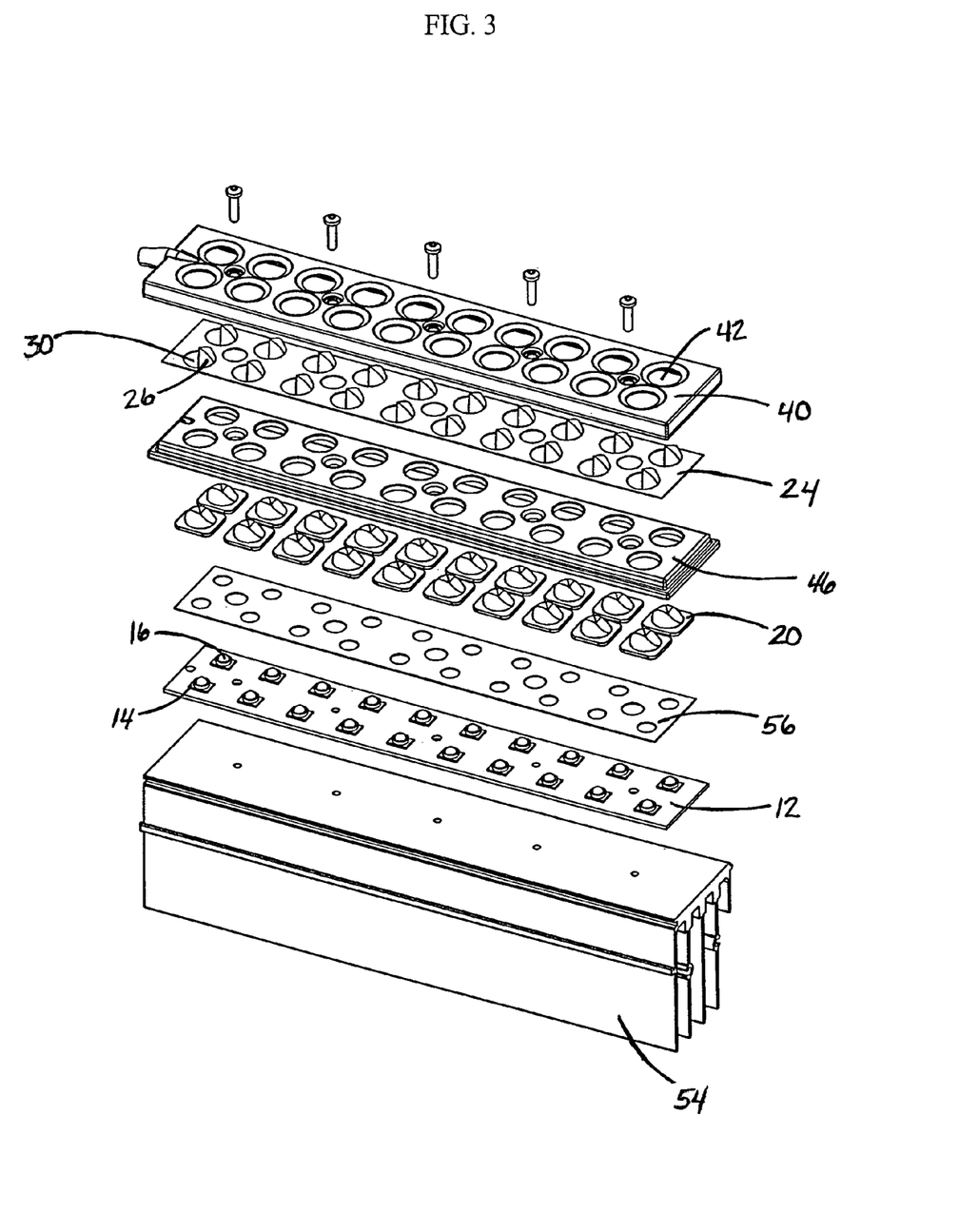
FIG. 3 is an exploded perspective view of a lighting apparatus of FIG. 1.
Figure 4:
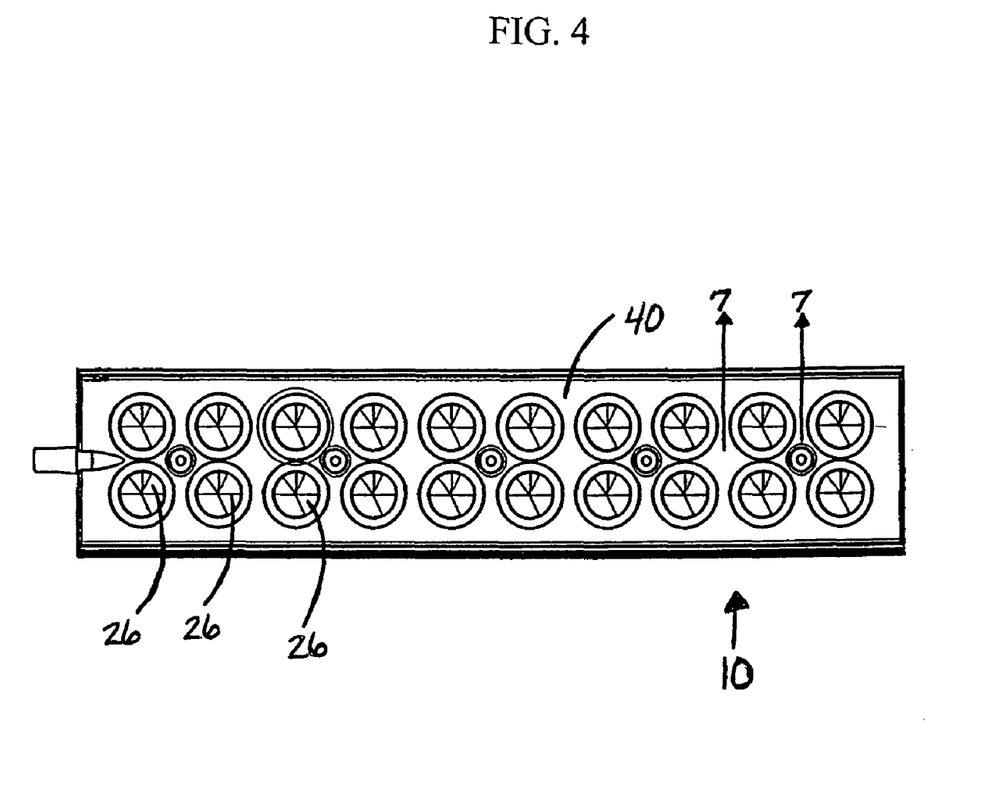
FIG. 4 is a top view of a lighting apparatus of FIG. 1.
Figure 5:
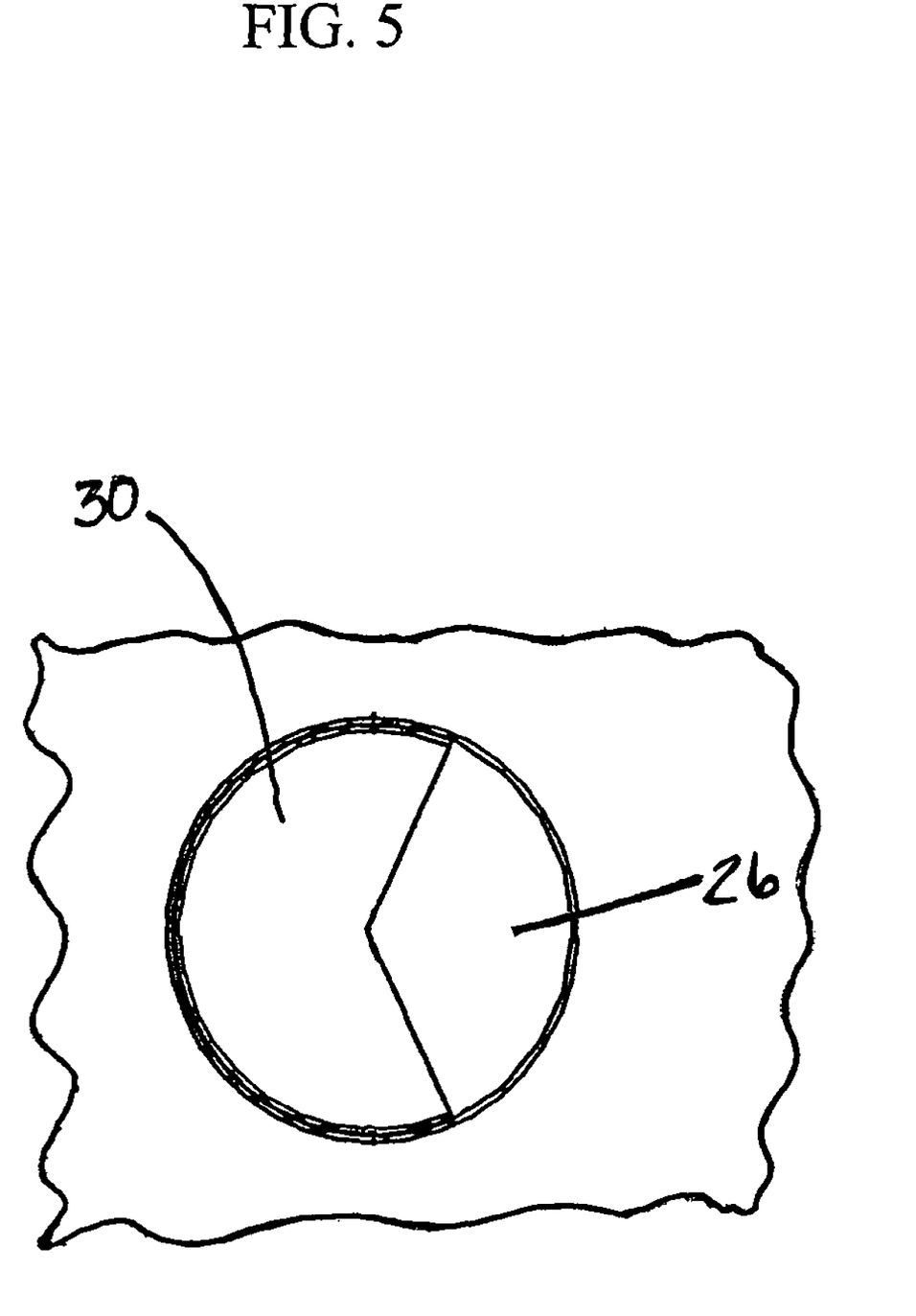
FIG. 5 is a fragmentary view of a shield portion of the shield member layer.
Figure 6:
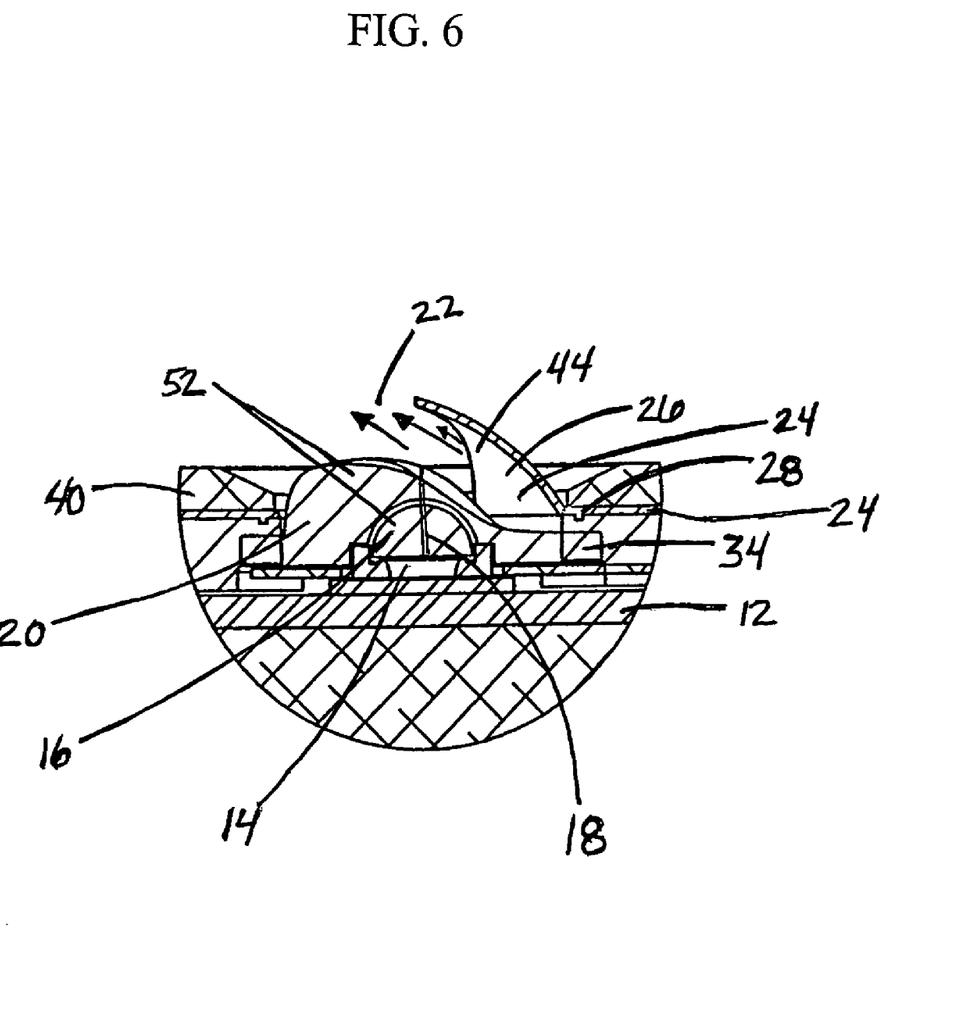
FIG. 6 is a sectional view taken along section 7-7 as indicated in FIG. 4.

As shown in FIG. 3 shield member 24, in the form of a layer, is positioned over mounting board 12, LED package 14 and secondary lens member 20. Shield member 24 has shield portion 26 and a substantially planar non-shield portion 28 thereabout as seen in FIG. 6. FIGS. 5 and 6 illustrate that shield member 24 has a shield-member aperture 30 aligned with light path 22 and shield portion 26 border shield-member aperture 30.

Figure 7:
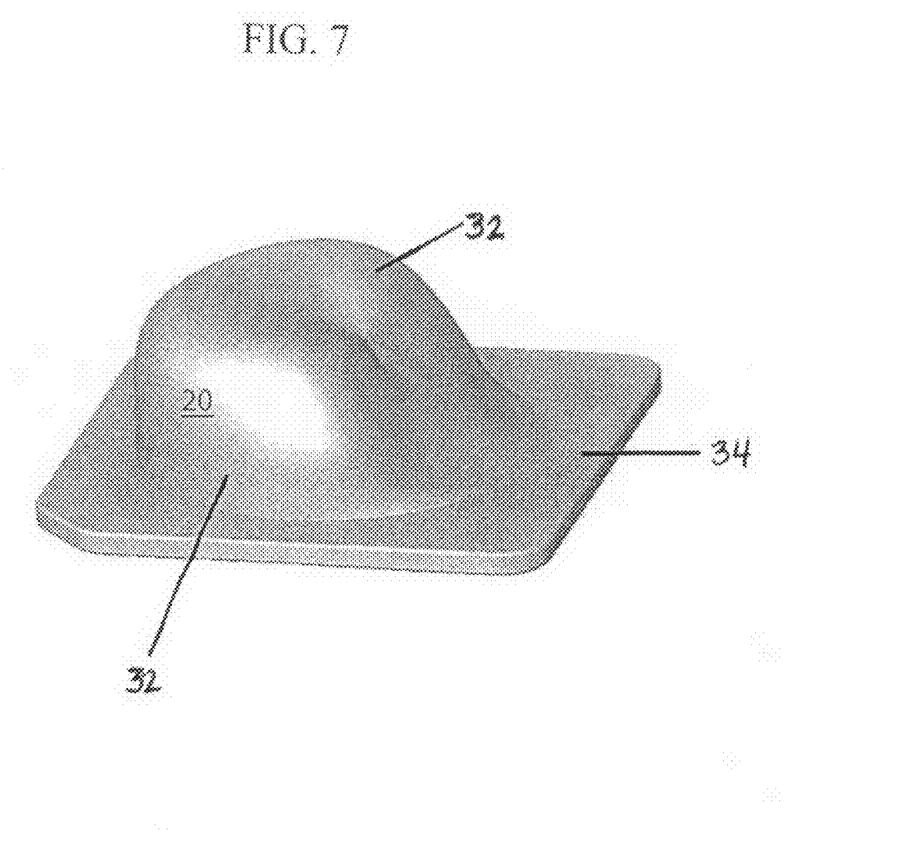
FIGS. 7-8 are perspective views of one of the secondary lenses of the apparatus of FIG. 1, primarily illustrating the outer lens surface of the secondary lens.
Figure 8:
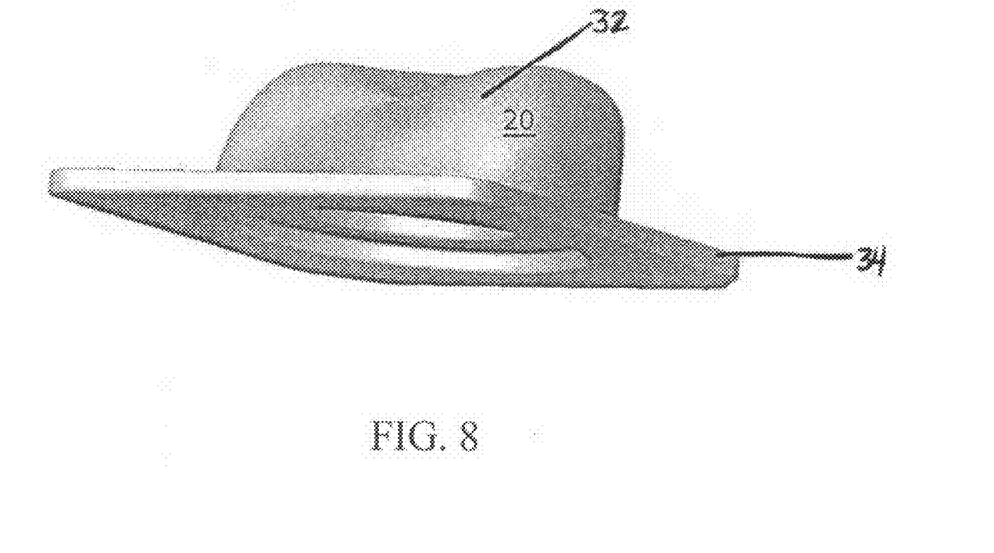
Figure 9:
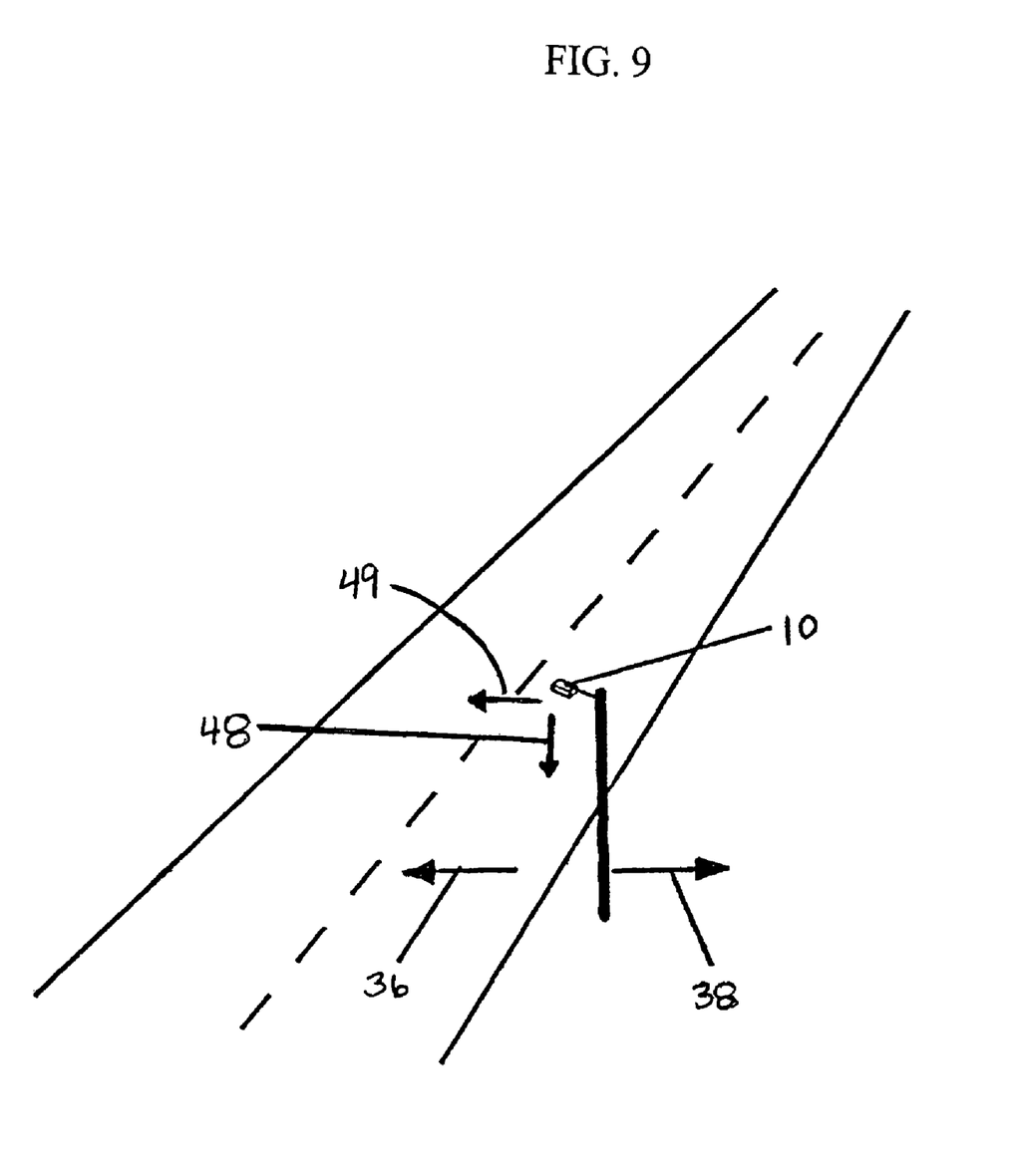
FIG. 9 is a schematic perspective representation of a light pole mounting a lighting fixture including the inventive LED apparatus therein; the pole is positioned along the side of a roadway.
Figure 10:
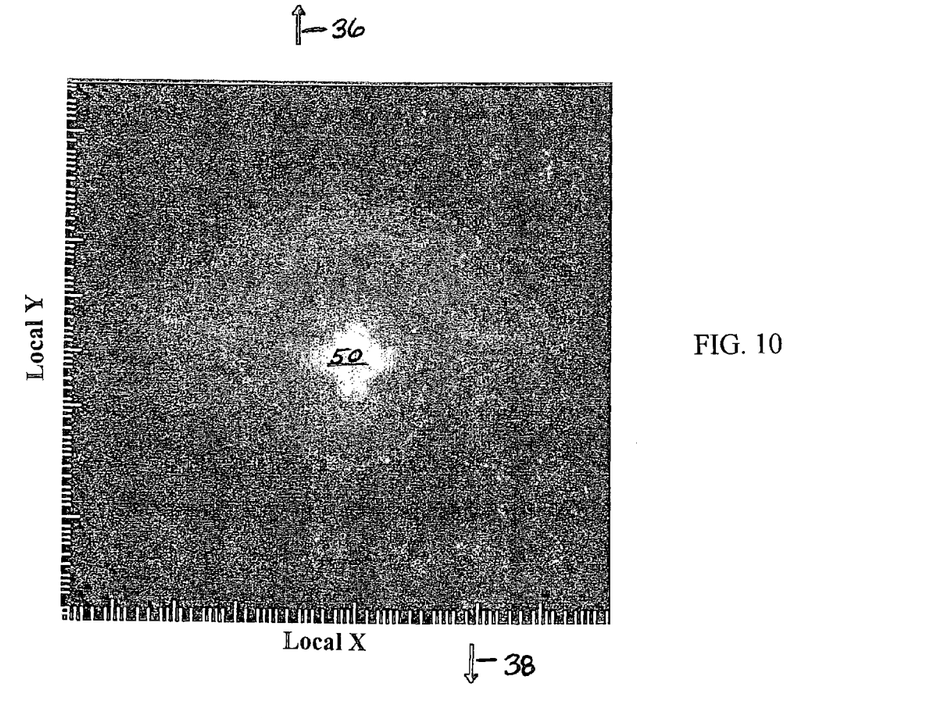
FIG. 10 is a two-dimensional illumination intensity distribution of a lighting fixture such as in FIG. 9 having lighting apparatus as described but without the shielding layer. It does not represent the invention, but is not prior art.
Figure 11:
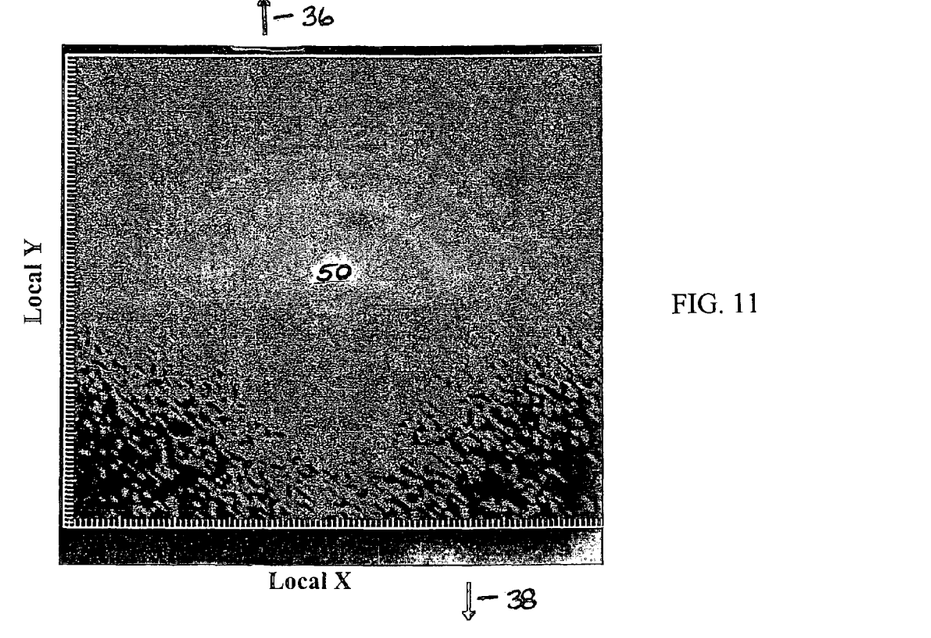
FIG. 11 is a two-dimensional illumination intensity distribution of a lighting fixture such as in FIG. 9 having lighting apparatus as described with the shielding layer.

As shown in FIGS. 7 and 8, secondary lens 20 includes a lens portion 32 which is substantially transparent and a flange 34 portion thereabout. Lens portions 32 is adjacent to flange portion 34 as illustrated in FIGS. 7 and 8. Shield portion 26 extends over a part of lens portion 32 of secondary lens member 20. Secondary lens member 20 is asymmetrical and has an illumination pattern 50 with a preferential side 36 and a non-preferential side 38 as shown in FIGS. 9-11. Shield portion 26 is positioned to intercept light on non-preferential side 38.

In FIGS. 10 and 11, secondary lens 20 defines preferential side as indicated by reference number 36. FIGS. 10 and 11 also indicate, by reference number 38, the direction toward the opposite, non-preferential side 38.

FIGS. 10 and 11 illustrate a two-dimensional illumination intensity distribution 50 for an embodiment containing an LED package 14, a single primary lens 16 and a single secondary lens 20. Pattern 50 in FIGS. 10 and 11 was generated using optical ray-tracing software to simulate the illumination intensity emanating from LED apparatus 10.

The brightness of illumination pattern 50 in FIG. 11 illustrates the relative intensity distribution using a shield member layer 24, demonstrating that a very large percentage of the light emanating from apparatus 10 is redirected toward the preferential side 36 by shield member layer 24 of apparatus 10 and only a small amount of trespass light on the non-preferential side 38. FIG. 10 illustrates the relative intensity distribution without the shield member layer 24 present, demonstrating that light is not blocked from the apparatus 10 resulting in a large amount of trespass light on the non-preferential side 38.

FIGS. 1-4 illustrate that cover 40 secures shield member 24 with respect to secondary lens member 20, primary lens 16 and LED package 14. Cover 40 has an opening 42 aligned with the light path 22 as shown in FIGS. 1-3. Shield member 24 is sandwiched between cover 40 and flange 34 of secondary lens member 20

As illustrated in FIG. 6 when cover 40 is secured in place the sandwiching is of the non-shield portion 28 of shield member 24 and of flange 34 of secondary lens member 20. In certain embodiments, flange 34 of secondary lens member 20 is sandwiched against mounting board 12.

In certain embodiments, as illustrated in FIG. 6, shield portion 26 of shield member 24 has a reflective surface 44 facing secondary lens member 20. Another embodiment of the LED apparatus 10 is where an enclosure barrier member layer, such as a gasket 46, is sandwiched between the shield member 24 and secondary lens member 20 as shown in FIG. 3. In yet another embodiment of LED apparatus 10 is where an aluminum layer 56 is sandwiched between the mounting board 12 and the secondary lens member 20 as seen in FIG. 3.

LED apparatus 10 can consist of only one LED package 14 on a mounting board 12 with a corresponding primary lens 16, secondary lens member 20 and shield member 24 or a plurality of LED packages 14 on a mounting board 12 with corresponding primary lenses 16, secondary lens members 20 and shield members 24.

In some embodiments, as shown in FIG. 3, a plurality of LED packages 14 are spaced from one another on the mounting board 12. A plurality of secondary lens members 20 are also present in certain embodiments as illustrated in FIG. 3. Each secondary lens member 20 is positioned over the primary lens 16 of a corresponding LED package 14. Each primary-lens/secondary-lens-member pair 52 establishes a light path 22 and has a central axis 18 as shown in FIG. 6. A plurality of shield portions 26 of the shield member 24 are also present in certain embodiments as illustrated in FIG. 3. As shown in FIGS. 3 and 6 each shield portion 26 is positioned partially over each primary-lens/secondary-lens-member pair 52 thereby to intercept a portion of the light path 22 emitted from the corresponding LED package 14.

A wide variety of materials are available for the various parts discussed and illustrated herein. While the principles of this apparatus have been described in connection with specific embodiments, it should be understood clearly that these descriptions are made only by way of example and are not intended to limit the scope of the invention.

The invention is claimed:

1. In an LED apparatus for illumination toward a preferential side in a downward and outward direction including (a) a mounting board, (b) an LED package thereon with a primary lens having a central axis, and (c) a secondary lens member over the primary lens and establishing a light path therebetween, the secondary lens member including a lens portion and a flange thereabout, the improvement comprising a shield member in the form of a layer positioned over the mounting board, LED package and secondary lens member, the shield member having a shield portion and a substantially planar non-shield portion thereabout, the shield member also having a shield-member aperture aligned with the light path and the shield portion bordering the shield-member aperture.

2. The LED apparatus of claim 1 wherein:
the shield portion extends over a part of the lens portion of the secondary lens member.

3. The LED apparatus of claim 2 wherein:
the secondary lens member is asymmetrical and has an illumination pattern with a preferential side and a non-preferential side; and
the shield portion is positioned to intercept light on the non-preferential side.

4. The LED apparatus of claim 1 further including a cover securing the shield member with respect to the secondary lens member, the primary lens and the LED package.

5. The LED apparatus of claim 4 wherein the cover has an opening aligned with the light path.

6. The LED apparatus of claim 4 wherein the shield member is sandwiched between the cover and the flange of the secondary lens member.

7. The LED apparatus of claim 6 wherein the flange of the secondary lens member is against the mounting board.

8. The LED apparatus of claim 6 wherein the sandwiching is of the non-shield portion of the shield member and of the flange of the secondary lens member when the cover is secured in place.

9. The LED apparatus of claim 8 further comprising a resilient gasket disposed between the shield member and the lens member.

10. The LED apparatus of claim 1 comprising:
a plurality of LED packages spaced from one another on the mounting board;
a plurality of the secondary lens members, each secondary lens member positioned over the primary lens of a corresponding LED package, each primary-lens/secondary-lens-member pair establishing a light path and having a central axis; and
a plurality of shield portions of the shield member, each shield portion positioned partially over each primary-lens/secondary-lens-member pair thereby to intercept a portion of the light emitted from the corresponding LED package.

11. The LED apparatus of claim 10 wherein for each shield portion of the shield member a shield-member aperture is aligned with the corresponding light path and the shield portion borders the shield-member aperture.

12. The LED apparatus of claim 10 wherein
each shield portion extends over a part of a corresponding lens portion.

13. The LED apparatus of claim 12 wherein for each shield portion of the shield member a shield-member aperture is aligned with the corresponding light path and the shield portion borders the shield-member aperture.

14. The LED apparatus of claim 12 wherein:
each secondary lens member is asymmetrical and has an illumination pattern with a preferential side and a non-preferential side; and
each corresponding shield portion is positioned to intercept light on the non-preferential side.

15. The LED apparatus of claim 10 further including a cover securing the shield member with respect to the secondary lens members, the primary lenses and the LED packages.

16. The LED apparatus of claim 15 wherein the cover has an opening aligned with the light path.

17. In an LED apparatus for illumination toward a preferential side in a downward and outward direction including (a) a mounting board and (b) an LED package thereon with a primary lens having a central axis, the improvement comprising a shield member in the form of a layer positioned over the mounting board and LED package, the shield member having a shield portion and a substantially planar non-shield portion thereabout, the shield member also having a shield-member aperture aligned with the light path and the shield portion bordering the shield-member aperture.

18. In an LED apparatus for illumination toward a preferential side in a downward and outward direction including (a) a mounting board, (b) an LED device thereon, and (c) a lens member over the LED device and establishing a light path therebetween, the improvement comprising a shield member in the form of a layer positioned over the mounting board, LED device and lens member, the shield member having a shield portion and a substantially planar non-shield portion thereabout, the shield member also having a shield-member aperture aligned with the light path and the shield portion bordering the shield-member aperture.

19. The LED apparatus of claim 18 wherein
the shield portion extends over a part of the lens portion of the lens member.

20. The LED apparatus of claim 19 wherein:
the lens member is asymmetrical and has an illumination pattern with a preferential side and a non-preferential side; and
the shield portion is positioned to intercept light on the non-preferential side.

21. The LED apparatus of claim 18 further including a cover securing the shield member with respect to the lens member and LED device.

22. The LED apparatus of claim 18 comprising:
a plurality of LED devices spaced from one another on the mounting board;
a plurality of the lens members, each lens member positioned over the corresponding LED device, each lens member/LED device pair establishing a light path and having a central axis; and
a plurality of shield portions of the shield member, each shield portion positioned partially over each lens member/LED device pair thereby to intercept a portion of the light emitted from the corresponding LED device.

23. In an LED apparatus for illumination toward a preferential side in a downward and outward direction including (a) a mounting board, (b) an LED device thereon, and (c) a lens member having a central axis, the improvement comprising a shield member in the form of a layer positioned over the mounting board, LED device and lens member, the shield member having a shield portion and a substantially planar non-shield portion thereabout, the shield member also having a shield-member aperture aligned with the light path and the shield portion bordering the shield-member aperture.

24. The LED apparatus of claim 23 wherein the shield member is sandwiched between the mounting board and the cover.

* * * * *